(12) United States Patent
Hassani et al.

(10) Patent No.: US 12,300,036 B2
(45) Date of Patent: May 13, 2025

(54) BIOMETRIC TASK NETWORK

(71) Applicant: Ford Global Technologies, LLC, Dearborn, MI (US)

(72) Inventors: Ali Hassani, Ann Arbor, MI (US); Hafiz Malik, Canton, MI (US); Rafi Ud Daula Refat, Southgate, MI (US); Zaid El Shair, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 17/730,301

(22) Filed: Apr. 27, 2022

(65) Prior Publication Data

US 2023/0260328 A1    Aug. 17, 2023

Related U.S. Application Data

(60) Provisional application No. 63/310,401, filed on Feb. 15, 2022.

(51) Int. Cl.
*G06V 40/40* (2022.01)
*G06V 10/82* (2022.01)
*G06V 40/16* (2022.01)

(52) U.S. Cl.
CPC .............. *G06V 40/45* (2022.01); *G06V 10/82* (2022.01); *G06V 40/168* (2022.01)

(58) Field of Classification Search
CPC ...... G06V 40/45; G06V 10/82; G06V 40/168; G06V 40/40; G06V 40/16; G06V 40/173; A61B 5/1176
See application file for complete search history.

(56) References Cited

U.S. PATENT DOCUMENTS

| 7,797,803 B2 | 9/2010 | Falb et al. |
| 10,179,563 B2 | 1/2019 | Ammons |

(Continued)

FOREIGN PATENT DOCUMENTS

| CN | 106529402 B | 5/2019 |
| CN | 110930982 A | 3/2020 |

(Continued)

OTHER PUBLICATIONS

T. Devries, K. Biswaranjan and G. W. Taylor, "Multi-task Learning of Facial Landmarks and Expression," 2014 Canadian Conference on Computer and Robot Vision, 2014, pp. 98-103, doi: 10.1109/CRV.2014.21.

(Continued)

*Primary Examiner* — Andrew M Moyer
*Assistant Examiner* — Ahmed A Nasher
(74) *Attorney, Agent, or Firm* — Frank Lollo; Brooks Kushman P.C.

(57) ABSTRACT

A deep neural network can provide output from a selected biometric analysis task that is one of a plurality of biometric analysis tasks based on an image. The selected biometric analysis task can be performed in a deep neural network that includes a common feature extraction neural network, a plurality of biometric task-specific neural networks, a plurality of segmentation mask neural networks and an expert pooling neural network that perform the plurality of biometric analysis tasks by inputting the image to the common feature extraction network to determine latent variables. The latent variables can be input to the plurality of biometric task-specific neural networks to determine a plurality of biometric analysis task outputs. The latent variables can be input to a segmentation neural network to determine a facial feature segmentation output. The facial feature segmentation (Continued)

output can be output to a plurality of segmentation mask neural networks.

20 Claims, 11 Drawing Sheets

(56) References Cited

U.S. PATENT DOCUMENTS

| | | |
|---|---|---|
| 10,747,989 B2 | 8/2020 | Zou et al. |
| 10,860,837 B2 | 12/2020 | Ranjan et al. |
| 2018/0060648 A1 | 3/2018 | Yoo et al. |
| 2018/0365532 A1 | 12/2018 | Molchanov et al. |
| 2020/0210688 A1 | 7/2020 | Xu |
| 2020/0394390 A1* | 12/2020 | Zhang ............... H04N 5/33 |
| 2021/0117984 A1 | 4/2021 | Sharma et al. |
| 2021/0150240 A1 | 5/2021 | Yu et al. |
| 2022/0406090 A1* | 12/2022 | Liu ............... G06N 3/0455 |
| 2023/0063229 A1 | 3/2023 | Vemulapalli et al. |
| 2023/0074706 A1* | 3/2023 | Xiao ............... G06V 30/1444 |
| 2023/0154090 A1* | 5/2023 | Bradley ............... G06T 13/40<br>345/419 |
| 2023/0206700 A1* | 6/2023 | Khan ............... G06V 40/165<br>382/116 |
| 2023/0206925 A1* | 6/2023 | Havdan ............... G10L 17/18<br>704/200 |

FOREIGN PATENT DOCUMENTS

| | | |
|---|---|---|
| CN | 111539480 A | 8/2020 |
| CN | 110659744 B | 6/2021 |
| KR | 101579288 B1 | 12/2015 |
| WO | 2016026063 A1 | 2/2016 |
| WO | 2022003107 A1 | 1/2022 |

OTHER PUBLICATIONS

Notice of Allowance dated Aug. 23, 2023 re U.S. Appl. No. 17/730,324, filed Apr. 27, 2022.
Final Office Action dated Apr. 2, 2025 re U.S. Appl. No. 17/730,315, filed Apr. 27, 2022.

* cited by examiner

BIOMETRIC TASK NETWORK

CROSS-REFERENCE TO RELATED APPLICATION

This patent application claims priority to U.S. Provisional Patent Application No. 63/310,401 filed on Feb. 15, 2022, which is hereby incorporated by reference in its entirety.

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more image sensors that can be processed to determine data regarding objects. Data extracted from images of objects can be used by a computer to operate systems including vehicles, robots, security, and object tracking systems.

DETAILED DESCRIPTION

Figure 1:
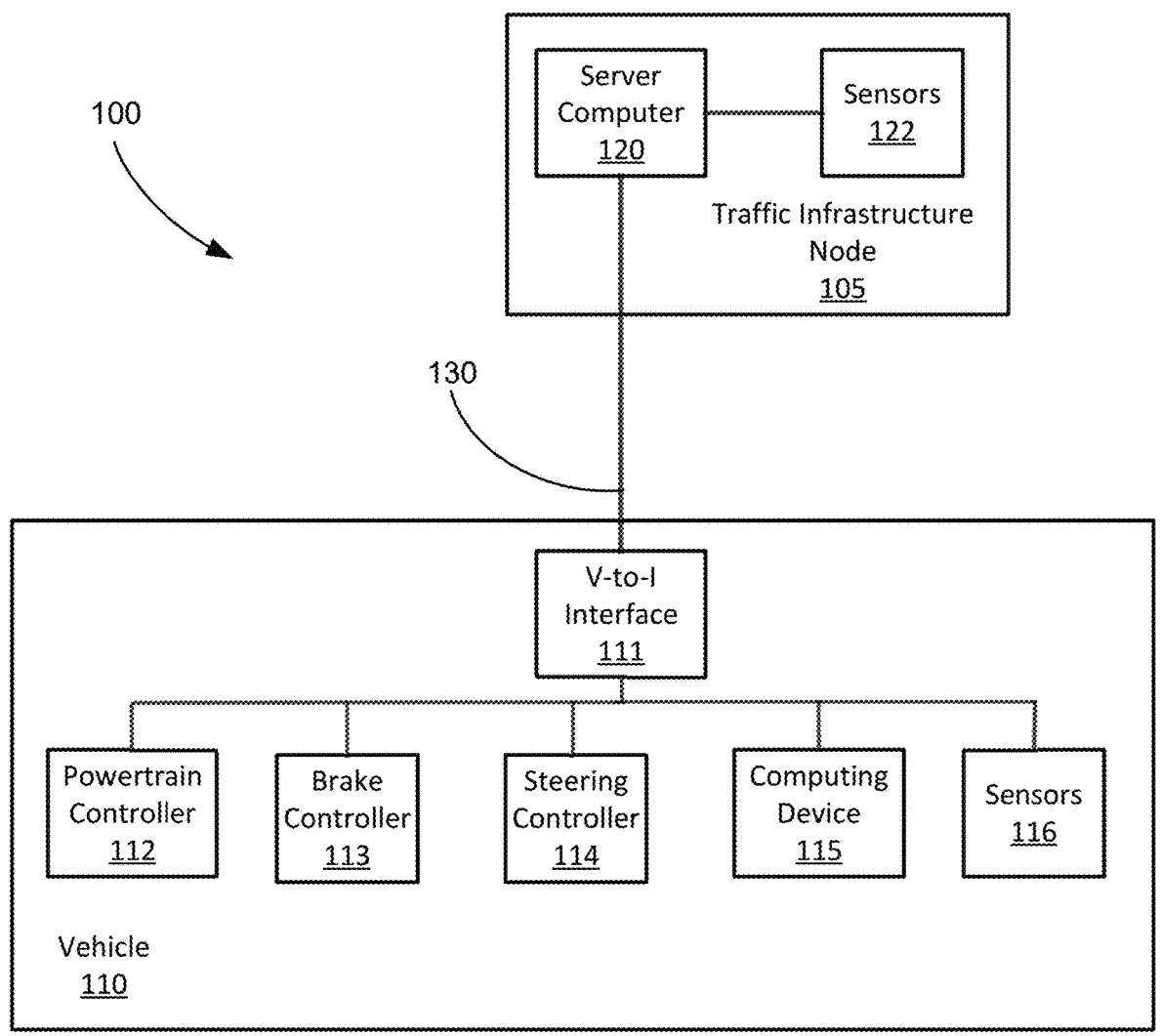
FIG. 1 is a block diagram of an example traffic infrastructure system.

Biometric analysis can be implemented in a computer to determine data regarding objects, for example potential users, in or around system or machine, such as a vehicle. Based on data determined from biometric analysis a vehicle, for example, can be operated. Biometric analysis herein means measuring or calculating data regarding a user based on physical characteristics of the user. For example, a computing device in a vehicle or traffic infrastructure system can be programmed to acquire one or more images from one or more sensors included in the vehicle or the traffic infrastructure system and grant permission for a user to operate the vehicle based on biometric data determined based on the images. This granting of permission is referred to herein as biometric identification. Biometric identification means determining the identity of a potential user. The determined identity of a user can be logged to keep track of which user is accessing a vehicle or compared to a list of authorized users to authenticate a user prior to granting permission to the user to operate a vehicle or system. Biometric analysis includes determining one or more physical characteristics such as user drowsiness, gaze direction, user pose, user liveliness, etc. Biometric analysis tasks can be applied to other machines or systems in addition to vehicles. For example, a computer system, a robot system, a manufacturing system, and a security system can require that a potential user be identified using an acquired image before granting access to the system or a secure area.

Advantageously, techniques described herein can enhance the ability of a computing device in a traffic infrastructure system to perform biometric analysis based on a recognition that facial biometric algorithms such as facial feature identification include redundant tasks across different applications. Further, some facial biometric algorithms have sparse or limited training datasets. Techniques described herein include a multi-task network that includes a common feature identification neural network and a plurality of biometric analysis task neural networks. A deep neural network is configured to include a common feature extraction neural network as a "backbone" and a plurality of biometric analysis task neural networks that receive as input a common set of latent variables generated by the common feature extraction neural network. The deep neural network includes a plurality of expert pooling deep neural networks that enhance training of the deep neural network by sharing results between the plurality of biometric analysis tasks.

Spoofing detection for biometric detection can benefit from multi-task biometric neural networks. Spoofing means using fraudulent techniques to fool a biometric identification system. For example, an unauthorized user seeking access to a vehicle protected by a biometric identification system can hold a life-sized picture of an authorized user in front of their face. In other examples an unauthorized user could wear a mask with a photograph of an authorized user to fool a biometric identification system into granting access. Spoofing detection by detecting photographs or masks is referred to as liveliness detection because it seeks to determine whether the facial features presented to the system are acquired from a live person as opposed to a photographic reproduction. Disclosed herein is an enhanced biometric identification system based on neural networks that incorporates output from image segmentation tasks with biometric identification tasks and skin tone biometric analysis tasks to enhance biometric identification and liveliness detection. Incorporating output from image segmentation tasks with biometric identification tasks and skin tone biometric analysis tasks enhances accuracy of both biometric identification and liveliness detection while reducing computing resources required to determine both tasks.

A method is disclosed herein including providing output from a selected biometric analysis task that is one of a plurality of biometric analysis tasks, based on an image provided from an image sensor wherein the selected biometric analysis task is performed in a deep neural network that includes a common feature extraction neural network, a plurality of biometric task-specific neural networks, a plurality of segmentation mask neural networks and an expert pooling neural network that perform the plurality of biometric analysis tasks by inputting the image to the common feature extraction neural network to determine latent variables. The latent variables can be input to the plurality of biometric task-specific neural networks to determine a plurality of biometric analysis task outputs. The latent variable can be input to a segmentation neural network to determine a facial feature segmentation output. The facial feature segmentation output can be input to a plurality of feature mask neural networks to determine a plurality of segmentation mask outputs. The plurality biometric analysis task outputs and the plurality of segmentation mask outputs can be input to the expert pooling neural network to determine a liveliness task output and the plurality of biometric analysis task outputs, and the liveliness task output can be output. A device can be operated based on the output from the deep neural network according to the selected biometric analysis task. A plurality of segmentation mask outputs from one or more segmentation mask neural networks can be stored in one or more memories to determine temporal segmentation mask outputs based on a sequence of frames of video data.

The plurality of biometric analysis tasks can include biometric identification, liveliness determination, drowsiness determination, gaze determination, pose determination, and facial feature segmentation. The common feature extraction neural network can include a plurality of convolutional layers. The plurality of biometric task-specific neural networks can include a plurality of fully connected layers. The plurality of segmentation mask neural networks can include a plurality of fully connected layers. The expert pooling neural network can include a plurality of fully connected layers. The deep neural network can be trained by determining a plurality of loss functions for the plurality of biometric analysis task outputs and the liveliness task output based on ground truth, combining the plurality of loss functions to determine a joint loss function, and backpropagating the loss functions and the joint loss function through the deep neural network to output a set of weights. The plurality of biometric analysis task outputs and the liveliness task output can be input to a plurality of SoftMax functions before being input to the plurality of loss functions. One or more outputs from the plurality of biometric task-specific neural networks and the liveliness task output can be set to zero during training. The deep neural network can be configured to include the common feature extraction network and a subset of the biometric task-specific neural networks during inference based on a selected biometric analysis task. The deep neural network can be trained based on a loss function determined based on sparse-categorical-cross-entropy statistics. The deep neural network can be trained based on a loss function determined based on mean-square-error statistics.

Further disclosed is a computer readable medium, storing program instructions for executing some or all of the above method steps. Further disclosed is a computer programmed for executing some or all of the above method steps, including a computer apparatus, programmed to provide output from a selected biometric analysis task that is one of a plurality of biometric analysis tasks, based on an image provided from an image sensor wherein the selected biometric analysis task is performed in a deep neural network that includes a common feature extraction neural network, a plurality of biometric task-specific neural networks, a plurality of segmentation mask neural networks and an expert pooling neural network that perform the plurality of biometric analysis tasks by inputting the image to the common feature extraction neural network to determine latent variables. The latent variables can be input to the plurality of biometric task-specific neural networks to determine a plurality of biometric analysis task outputs. The latent variable can be input to a segmentation neural network to determine a facial feature segmentation output. The facial feature segmentation output can be input to a plurality of feature mask neural networks to determine a plurality of segmentation mask outputs. The plurality biometric analysis task outputs and the plurality of segmentation mask outputs can be input to the expert pooling neural network to determine a liveliness task output and the plurality of biometric analysis task outputs, and the liveliness task output can be output. A device can be operated based on the output from the deep neural network according to the selected biometric analysis task. A plurality of segmentation mask outputs from one or more segmentation mask neural networks can be stored in one or more memories to determine temporal segmentation mask outputs based on a sequence of frames of video data.

The instructions can include further instructions wherein the plurality of biometric analysis tasks can include biometric identification, liveliness determination, drowsiness determination, gaze determination, pose determination, and facial feature segmentation. The common feature extraction neural network can include a plurality of convolutional layers. The plurality of biometric task-specific neural networks can include a plurality of fully connected layers. The plurality of segmentation mask neural networks can include a plurality of fully connected layers. The expert pooling neural network can include a plurality of fully connected layers. The deep neural network can be trained by determining a plurality of loss functions for the plurality of biometric analysis task outputs and the liveliness task output based on ground truth, combining the plurality of loss functions to determine a joint loss function, and backpropagating the loss functions and the joint loss function through the deep neural network to output a set of weights. The plurality of biometric analysis task outputs and the liveliness task output can be input to a plurality of SoftMax functions before being input to the plurality of loss functions. One or more outputs from the plurality of biometric task-specific neural networks and the liveliness task output can be set to zero during training. The deep neural network can be configured to include the common feature extraction network and a subset of the biometric task-specific neural networks during inference based on a selected biometric analysis task. The deep neural network can be trained based on a loss function determined based on sparse-categorical-cross-entropy statistics. The deep neural network can be trained based on a loss function determined based on mean-square-error statistics.

FIG. 1 is a diagram of a sensing system 100 that can include a traffic infrastructure node 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®)) or cellular networks. V-to-I interface 111 may accordingly include processors, memory, transceivers, etc., configured to utilize various wired and/or wireless networking technologies, i.e., cellular, BLUETOOTH® and wired and/or wireless packet networks. Computing device 115 may be configured for communicating with other vehicles 110 through V-to-I interface 111 using vehicle-to-vehicle (V-to-V) networks, i.e., according to Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120 can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary. That is, each sensor 122 is mounted to the infrastructure node so as to have a substantially unmoving and unchanging field of view.

Server computer 120 typically has features in common with the vehicle 110 V-to-I interface 111 and computing device 115, and therefore will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computing device 115 can receive sensor 116, 122 data to monitor one or more objects. An "object," in the context of this disclosure, is a physical, i.e., material, structure detected by a vehicle sensor 116 and/or infrastructure sensor 122. An object may be a biological object such as a human. A server computer 120 and/or computing device 115 can perform biometric analysis on object data acquired by a sensor 116/122.

Figure 2:
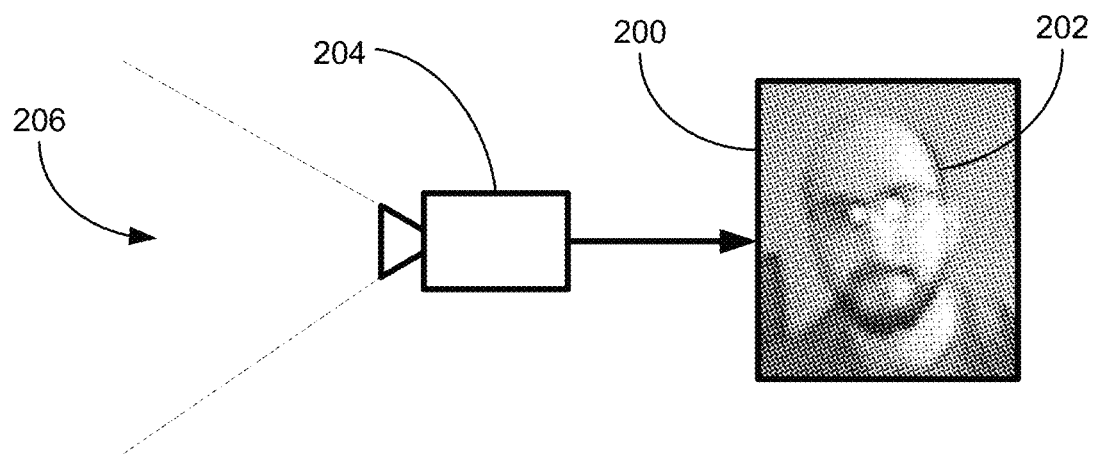
FIG. 2 is a diagram of an example biometric image.

FIG. 2 is a diagram of an image acquisition system 200 included in a vehicle 110 or traffic infrastructure node 105. Image 202 can be acquired by a camera 204, which can be a sensor 116, 122, having a field of view 206. The image 202 can be acquired when a user approaches a vehicle 110, for example. A computing device 115 in the vehicle 110 or a server computer 120 can execute a biometric analysis task that authenticates the user and grants permission to the user to operate the vehicle 110, i.e., unlocks a door to permit the user to enter the vehicle 110. In addition to biometric identification, spoof detection biometric analysis tasks such as liveliness detection can be used to determine whether the image data presented for user identification is a real image of a real user, i.e., not a photograph of a user or not a mask of a user.

Other biometric analysis tasks based on images of a user as are known in the art include drowsiness detection, head pose detection, gaze detection, and emotion detection. Drowsiness detection can determine a user's state of alertness typically by analyzing eyelid position and blink rates. Head pose detection can also determine a user's state of alertness and attention to vehicle operation, typically by analyzing location and orientation of a user's face to detect nodding and slumping postures. Gaze detection can determine the direction in which a user's eyes are looking to determine whether the user is paying attention to vehicle operation. Emotion detection can determine an emotional state of a user, i.e., is a user agitated or frightened, to detect possible distractions from vehicle operation.

Figure 3:
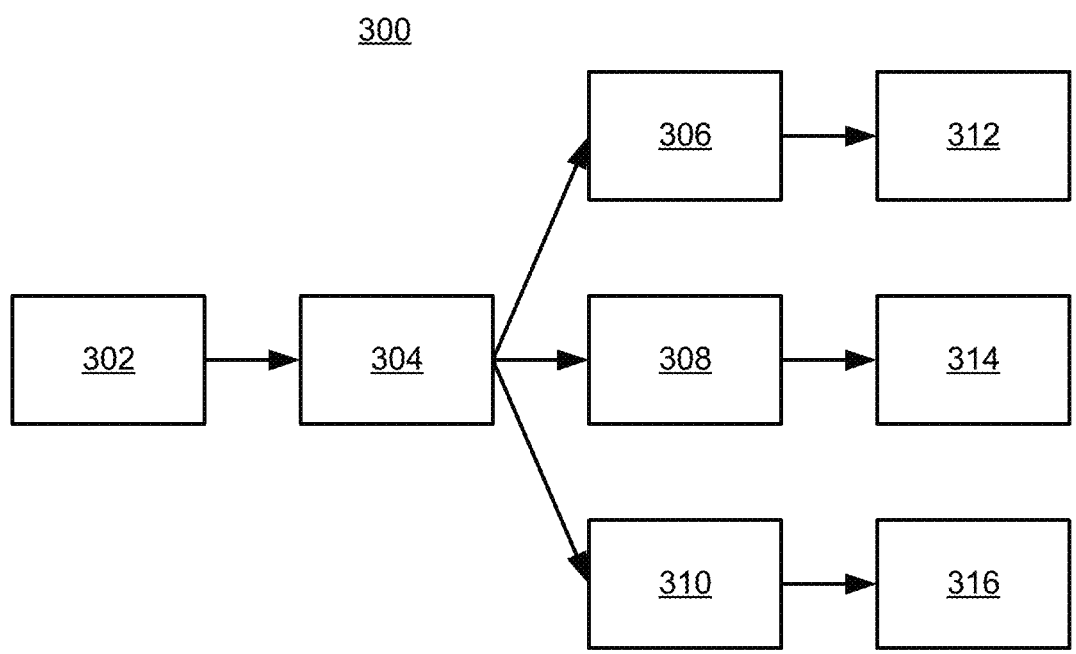
FIG. 3 is a diagram of an example biometric system.

FIG. 3 is a diagram of a biometric analysis task system 300. A biometric analysis task system 300 can be implemented on a server computer 120 or computing device 115. Biometric analysis tasks including user identification, spoof detection, drowsiness detection, head pose detection, and gaze detection share common computational tasks 304, such as determining a location and orientation of a user's face in an image 302. Other common computational tasks include determining location and size of facial features such as eyes, mouth, and nose. FIG. 3 illustrates an image 302 being input to common computational tasks 304 to determine common facial feature data such as location, orientation, and features, for example. The common facial feature data can be input to biometric analysis tasks 306, 308, 310 to determine biometric tasks outputs 312, 314, 316. The biometric task outputs can be 312, 314, 316 one or more of user identification, spoof detection, drowsiness detection, head pose detection, gaze detection, and emotion detection etc.

Figure 4:
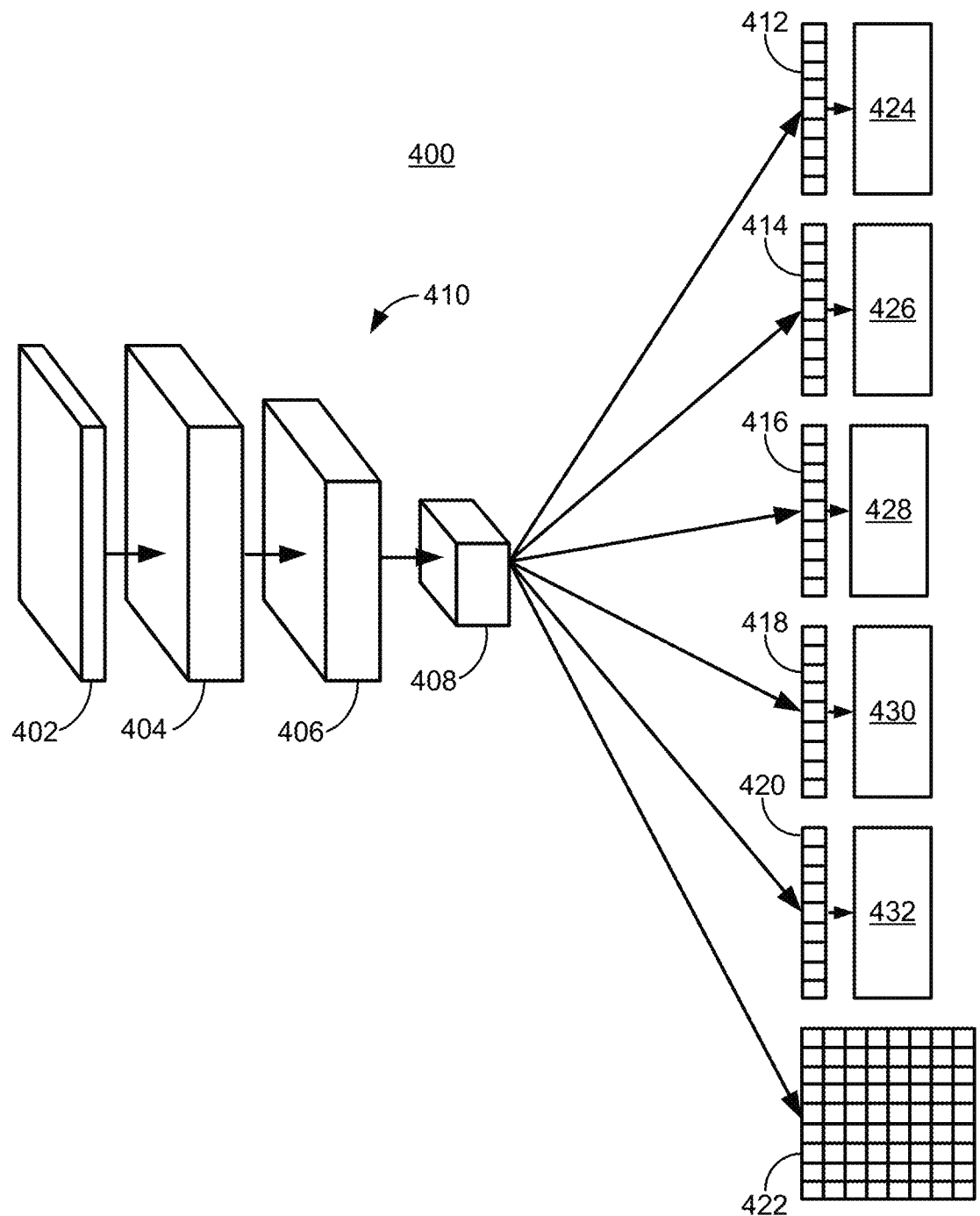
FIG. 4 is a diagram of an example multi-task biometric system.

FIG. 4 is a diagram of a biometric analysis task system implemented as a deep neural network (DNN) 400 configured to input an image 402 into a plurality of convolutional layers 404, 406, 408 that are included in a common feature extraction convolutional neural network (CNN) 410. A biometric analysis task system implemented as a DNN 400 can be executed on a server computer 120 or computing device 115. The common feature extraction or "backbone" CNN 410 extracts common facial features from image data and outputs latent variables. Latent variables are common facial features output by CNN 410 in response to an input image 402 that includes a human face. CNN 410 is trained as described herein to process an image 402 to determine the location of a human face and determine facial features indicating the location, orientation, and size of human facial features such as eyes, nose, and mouth. CNN 410 can also determine facial features such as skin tone, texture and presence/absence of facial hair, and presence/absence of objects such as glasses and body piercings. The facial features are referred to as common facial features because they are output as latent variables in common to a plurality of biometric analysis task neural networks 412, 414, 416, 418, 420 and a segmentation neural network 422. Biometric analysis task neural networks 412, 414, 416, 418, 420 include a plurality of fully connected layers that can perform tasks such as biometric identification, spoof detection including liveliness, drowsiness detection, head pose detection, gaze detection, and emotion detection. Segmentation neural network 422 can perform facial feature segmentation by determining regions in an image of a user's face that can include features such as eyes, teeth, lips, nose, and facial skin, for example.

Segmentation determines regions in an image indicating the different facial features. Segmentation labels the regions according to segment classes, where each segment class indicates a different facial feature. Example segment classes include left eye, right eye, teeth, upper lip, lower lip, nose, facial skin, left eyebrow, right eyebrow, etc. The number of facial segmentation classes can be equal to 14 or more for a typical segmentation neural network 422. Each segment is further specified by its location, shape, and number of pixels included in the segment. In determining a loss function, the segments in a predicted segmented image output by segmentation neural network 422 can be compared to the segments in a ground truth segmented image. Comparing segments includes determining that the pixels of a predicted segment overlap with the pixels of a ground truth segment having the same class designation. The comparison can be qualitative, based on sparse-categorical-cross-entropy statistics, which requires that a percentage, for example 50%, of the ground truth segment pixels are overlapped with a predicted segment with the same class designation. In other examples the comparison can be quantitative, based on mean-square-error statistics which count the number of non-overlapped pixels in the ground truth segments and take the square of the number of non-overlapped pixels.

Biometric analysis task neural networks 412, 414, 416, 418, 420 and segmentation neural network 422 are trained to output predictions regarding the biometric analysis tasks or segmentation task based on latent variables output from the common feature extraction CNN 410. Predictions output from the biometric analysis tasks include biometric identification of a user. A biometric identification prediction is a probability that an input image includes a human face that matches a human face that the DNN 400 was previously trained to recognize. A liveliness prediction is a probability that the image 402 includes a live user, as opposed to a photograph or mask of a user. A drowsiness prediction is a probability that the image 402 includes a user experiencing drowsiness. A head pose prediction are estimates of the roll, pitch, and yaw of a user's head. An emotion prediction is a probability that the user is experiencing a strong emotion such as anger or fear. A facial segmentation prediction is an image with regions which indicate the locations of facial features.

DNN 400 can include SoftMax functions 424, 426, 428, 430, 432 on the output of the biometric analysis task neural networks 412, 414, 416, 418, 420, respectively. The SoftMax functions 424, 426, 428, 430, 432 are functions that turn a vector of K real values into a vector of K real values between 0 and 1 that sum to 1. Output from the SoftMax functions 424, 426, 428, 430, 432 can be output as results of the biometric analysis tasks or used to calculate loss functions. Processing the outputs of the biometric analysis task neural networks 412, 414, 416, 418, 420 with SoftMax functions 424, 426, 428, 430, 432 permits the outputs to be combined into a joint loss function for training the DNN 400. A loss function compares the output from a SoftMax function 424, 426, 428, 430, 432 connected to a biometric analysis task neural network 412, 414, 416, 418, 420 with a ground truth value to determine how closely the biometric analysis task neural network has come to determining a correct result. A SoftMax function 424, 426, 428, 430, 432, by limiting the output from each biometric analysis task neural network 412, 414, 416, 418, 420 to values between 0 and 1 prevents one or more of the outputs from dominating the calculation of a joint loss function due to numerical differences in the outputs. A joint loss function is determined by combining the individual loss functions for each biometric analysis task neural network 412, 414, 416, 418, 420, typically by adding the individual loss functions together.

Training a DNN 400 can include determining a training dataset of images 402 and ground truth for each image 402. Ground truth is data regarding objects included in an image 402 that indicates a result to be expected when processing the image with a DNN 400. For example, if the DNN 400 is being trained to determine the identity of a user included in the image 402, ground truth would include the identity of the user. Determining ground truth can include inspecting the images 402 in the training dataset and estimating the correct result to be expected from a SoftMax function 424, 426, 428, 430, 432 connected to a biometric analysis task neural network 412, 414, 416, 418, 420. During training, the output from biometric analysis tasks will can be compared to ground truth previously determined for the biometric analysis tasks to determine a loss function that indicates the accuracy with which DNN 400 processed the image 402.

During training an image 402 can be input to the DNN 400 a plurality of times. Each time the image 402 is input, a loss function is determined based on the ground truth and weights or parameters that control the operation of the convolutional layers 404, 406, 408, of the CNN 410 and the fully connected layers of the biometric analysis task neural networks 412, 414, 416, 418, 420 can be altered based on the loss function. The loss function can be backpropagated through the DNN 400 to select the weights for each layer that result in the lowest joint loss, i.e., the most correct results. Backpropagation is a process for applying the loss function to the weights of the DNN 400 layers starting at the layers closest to the output and progressing back to the layers closest to the input. By processing a plurality of input images 402 including ground truth in the training dataset a plurality of times, a set of weights for the layers of the DNN 400 can be selected that converge on correct results for the entire training dataset the DNN 400 can be determined. Selecting an optimum set of weights in this fashion is referred to as training the DNN 400.

Training the DNN 400 using a joint loss function can advantageously compensate for differences in training datasets for each biometric analysis task. A joint loss function is determined based on combining individual loss functions for the biometric analysis tasks. The joint loss function can be determined by summing the individual loss functions for the biometric analysis tasks. The quality of training for a biometric task can be dependent upon the number of images available with appropriate ground truth for each biometric analysis task. For example, biometric identification tasks can benefit from the existence of large commercially available datasets that include ground truth. Other biometric analysis tasks, such as drowsiness determination or gaze determination can require that a user acquire image data and estimate ground truth manually. Advantageously, training DNN 400 using a joint loss function determined as discussed herein can permit sharing training datasets between biometric analysis tasks having large training datasets with biometric analysis tasks having smaller training datasets. For example, the individual loss functions can be weighted as they are combined to form a joint loss function to give more weight to loss functions that include larger training datasets.

In examples where one or more of the biometric analysis tasks can have small amounts of ground truth data to include in a training dataset, training the DNN 400 can be enhanced by branch training isolation. Branch training isolation sets the output from a biometric analysis task neural network having no ground truth data for a particular image in a training dataset to a null value. Setting the output from a biometric analysis task neural network to a null value also sets the loss function determined for the biometric analysis task neural network to zero. Branch training isolation also freezes the weights included in the biometric analysis task neural network for that image. This permits the biometric analysis task neural network to be available for joint training along with the rest of the DNN 400 without penalizing biometric analysis tasks with sparse training datasets. For example, drowsiness detection typically has fewer images with ground truth than identification tasks.

Figure 5:
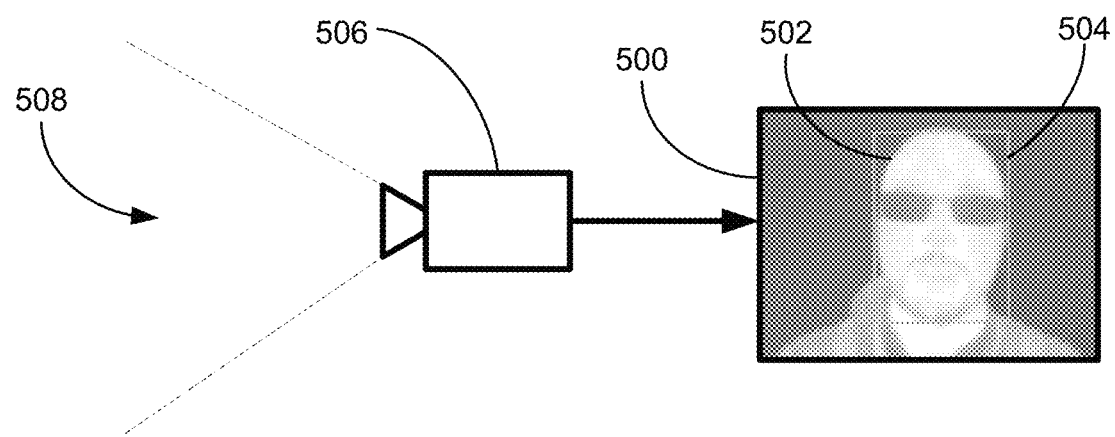
FIG. 5 is a diagram of an example spoofed biometric image.

FIG. 5 is a diagram of an image acquisition system 500 included in a vehicle 110 or traffic infrastructure node 105. Spoofed image 502 can be acquired by a camera 504, which can be a sensor 116, 122, having a field of view 508. The image 502 has been acquired of a user wearing a mask, e.g., made from spandex or the like, to appear as an authorized user of a vehicle. A computing device 115 in the vehicle 110 or a server computer 120 can execute a biometric analysis task that authenticates the user and grants permission to the user to operate the vehicle 110, i.e., unlocks a door to permit the user to enter the vehicle 110. In addition to biometric identification, spoof detection biometric analysis tasks such as liveliness detection can be used to determine whether the image data presented for user identification is a real image of a real user, i.e., not a photograph of a user or not a mask of a user. Without liveliness detection a biometric identification system could be spoofed into granting access to an unauthorized user.

Other techniques for anti-spoofing detection exist. For example, a 3D or depth scanner such as a lidar scanner can be employed in addition to a camera to acquire data of a potential user. The 3D scanner can detect the difference between a flat photograph and a human face. A thermal or far-infrared camera can detect characteristic thermal emissions from facial skin to distinguish a mask from a human face. Techniques discussed herein for incorporating output from image segmentation tasks with biometric identification tasks and skin tone biometric analysis tasks can enhance accuracy of both biometric identification and liveliness detection while eliminating a need for additional 3D or infrared sensors. By configuring the biometric analysis task neural network for multiple biometric tasks as described herein, training datasets can be used that include relatively fewer examples for tasks such as liveliness detection to produce good training results with fewer resources expended than if more training images and ground truth were required.

Figure 6:
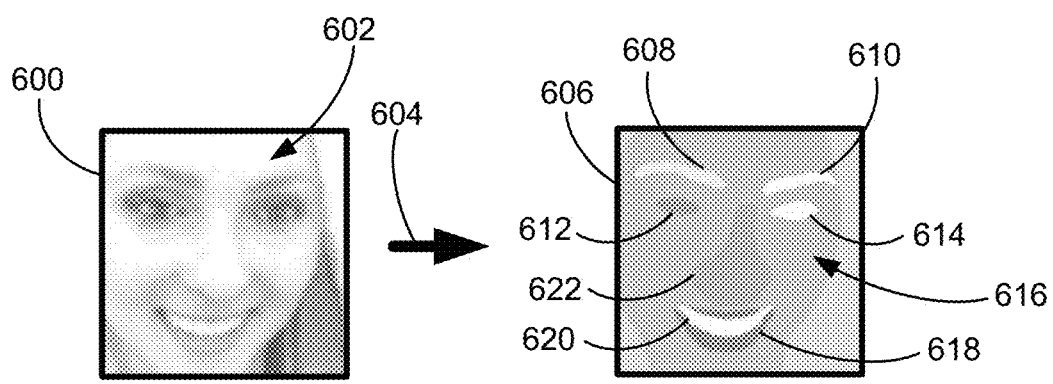
FIG. 6 is a diagram of an example segmented image.

FIG. 6 is a diagram of an image 600 of a human face 602 processed 604 with an image segmentation task as described herein to produce a segmented image 606. Segmented image 606 includes image segments indicating eyebrows 608, 610, eyes 612, 614, skin tone 616, lips 618 and teeth 620. Light reflectance measured on a camera image 600 of a human face can be useful for determining anti-spoofing, but only when the area of the image 600 is determined to be human skin. Determination of a difference between a photograph or a mask and a live human using reflectance data typically is accurate only when the region being processed is known to be human skin and is not obscured by hair or by features such as lips or eyes. Guiding liveliness determination using a segmented image 606 can enhance both training and inference of a biometric analysis task neural net.

Figure 7:
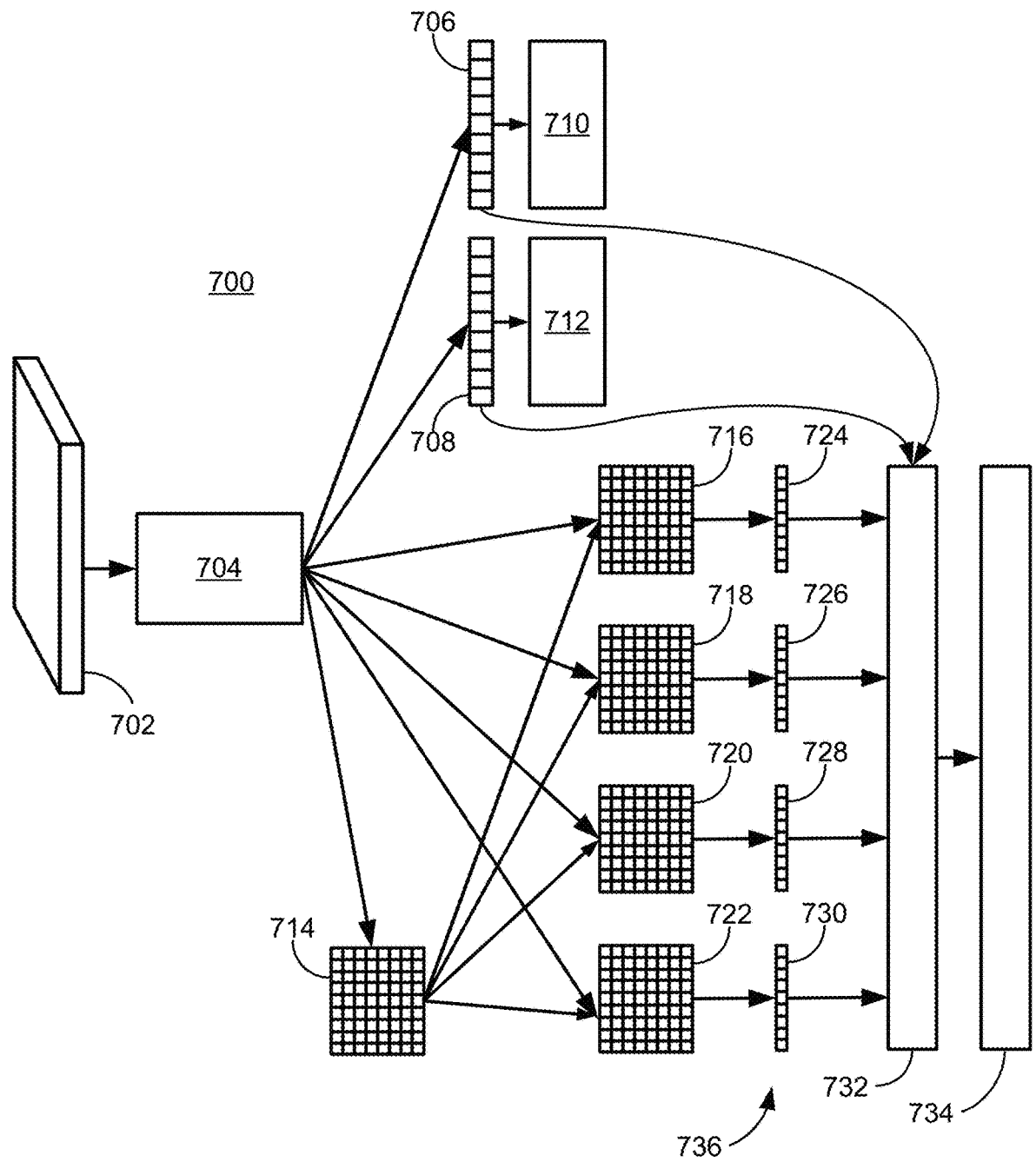
FIG. 7 is a diagram of example multi-task biometric system including segmented anti-spoofing processing.

FIG. 7 is a diagram of a DNN 700 configured to combine data from skin mask neural network 724 output, hair mask neural network 726 output, eye mask neural network 728 output, and mouth mask neural network 730 output with outputs for biometric identification neural network 706 and skin tone neural network 708. A segmentation mask or mask image is an image that includes labeled regions that indicate locations of features in an image, in this example, facial features including eyes, nose, mouth, etc. DNN 700 inputs an image 702 to a common feature extraction CNN 704. Latent variables output from the common feature extraction CNN 704, i.e., facial features, are output to biometric identification neural network 706, skin tone neural network 708, and segmentation neural network 714. The biometric identification neural network 706, skin tone neural network 708, and segmentation neural network 714 are collectively referred to herein as biometric task-specific neural networks. Biometric identification neural network 706 and skin tone neural network 708 neural networks include fully connected layers and produce predictions regarding the identity and the skin tone of a human face in the input image 702. Segmentation neural network 714 includes fully connected layers and produces a segmented image 606 as illustrated in FIG. 6.

Facial feature segmentation output from segmentation neural network 714 is combined with latent variables from common feature extraction CNN 704 to generate mask images that include skin mask 716, hair mask 718, eye mask 720 and mouth mask 722. Mask images including skin mask 716, hair mask 718, eye mask 720 and mouth mask 722 are input to skin mask neural network 724, hair mask neural network 726, eye mask neural network 728, and mouth mask neural network 730, collectively feature mask neural networks 736. Segmentation mask outputs from skin mask neural network 724, hair mask neural network 726, eye mask neural network 728, and mouth mask neural network 730 outputs are combined with predictions output from biometric identification neural network 706 and skin tone neural network 708 in expert pooling neural network 732. Expert pooling neural network 732 includes fully connected layers and processes the biometric identification neural network 706 and skin tone neural network 708 predictions based on skin mask neural network 724 output, hair mask neural network 726 output, eye mask neural network 728 output, and mouth mask neural network 730 output to determine a liveliness task output or liveliness prediction. At inference time the biometric identification prediction and the liveliness prediction are output to computing device 115 and/or server computer 120. A biometric identification prediction can be a probability that the face in an input image 702 matches a face used to train the DNN 700. The liveliness prediction can be a probability that the face in the input image 702 was acquired from a live human. The product of these two probabilities can be the probability that a correct identification was made on a live human and used to determine whether access should be granted to a vehicle, for example.

At training time, the biometric identification prediction and the liveliness prediction are output to SoftMax functions 710, 712, respectively to determine biometric analysis task outputs. Training a DNN 700 typically takes place on a server computer 120. The SoftMax functions 710, 712 map the outputs from the biometric identification neural network 706 and skin tone neural network 708 to intervals between 0 and 1 so they can be combined with outputs from a SoftMax function 734 that maps the output from the expert pooling neural network 732 to a 0 to 1 interval. The outputs from SoftMax functions 710, 712, 734 are combined with ground truth into a joint loss function to be backprojected through DNN 700 as discussed for training DNN 400 in relation to FIG. 4, above. Following training, DNN 700 can be transmitted to a computing device 115 in a vehicle 110 to perform biometric identification tasks on image data acquired by sensors 116 included the vehicle 110.

Determining a joint loss function can be a function of loss method, task complexity and fusion approach. Loss method is the mathematical technique for determining loss. As discussed above in relation to FIG. 4, determination of loss functions for segmented images can be based on segment classes or differences in segmented pixels. For example, using mean-squared-error, which calculates differences in pixel counts for facial mask segment outputs vs. ground truth, will generate loss proportional to a square of the number of pixels included in a facial mask segment class. Because there are potentially a large number of pixels in segments generated for an input image 702, the loss can be proportional to a large number. For example, the total number of pixels included in all segments can be in the 1000s. If the difference between the ground truth segmented image and the predicted segmented image is large, the difference in pixels can be a large number, for example 500. Because the mean-square-error is based on the square of the difference, it can be proportional to 5002, a very large number. Determining loss using sparse-categorical-cross-entropy, which determines probabilities of presence/absence for facial mask segment outputs vs. ground truth will be proportional to the number of classes of facial features. In this example, the number of facial classes includes left and right eyes, lips, teeth, nose, left and right eyebrows, etc. (e.g., 14 facial classes). Determining a loss function using sparse-categorical-cross-entropy statistics will typically result in a much smaller number than mean-square-error statistics. Determining loss values using the wrong technique that results in a large loss value can result in destructive training interference, where one loss value dominates the joint loss function.

Loss values can be normalized to reflect the task complexity, i.e., more complex (or hard) tasks can result in greater loss function values. In addition, it can be beneficial to bias the loss towards tasks that have outputs that are input to other tasks included in the DNN 400, 700. A dynamic loss scheme can be used to address this. In a dynamic loss scheme, losses can be normalized to be a 0 to 1 range based upon loss function complexity, where the loss functions are further weighted by training importance. Early in the training, input functions (i.e., semantic segmentation and ID here) can be prioritized by increasing a weight value applied to the loss function. Once their validation accuracy is enhanced, then the joint loss function can be weighted towards hard tasks (i.e., anti-spoofing), and then towards less complex tasks such as skin tone based upon further enhancements in validation accuracy. Determining a joint loss function as a function of loss method, task complexity and fusion approach can enhance training of a DNN 400, 700 by increasing the rate at which the training converges on a set of DNN 400, 700 weights that provide minimal joint loss functions over the training dataset. Increasing the rate at which the training converges decreases the time and computing resources required to train a DNN 400, 700.

In an example of biometric analysis tasks determined using a DNN 700, the DNN 700 can be trained as discussed above. At inference time, portions of DNN 700 including segmentation neural network 714, skin mask neural network 724, hair mask neural network 726, eye mask neural network 728, and mouth mask neural network 730 along with expert pooling neural network 732 can be removed from DNN 700 without reducing biometric identification accuracy. Biometric identification neural network 706, having been trained using the segmentation neural network 714, skin mask neural network 724, hair mask neural network 726, eye mask neural network 728, mouth mask neural network 730 and expert pooling neural network 732, can determine biometric identification with the same accuracy as when assisted with segmentation neural network 714 skin mask neural network 724, hair mask neural network 726, eye mask neural network 728, mouth mask neural network 730 and expert pooling neural network 732. Performing biometric identification without segmentation neural network 714, skin mask neural network 724, hair mask neural network 726, eye mask neural network 728, mouth mask neural network 730 and expert pooling neural network 732 can provide a DNN 700 that achieves high accuracy in less time while requiring fewer computer resources.

Figure 8:
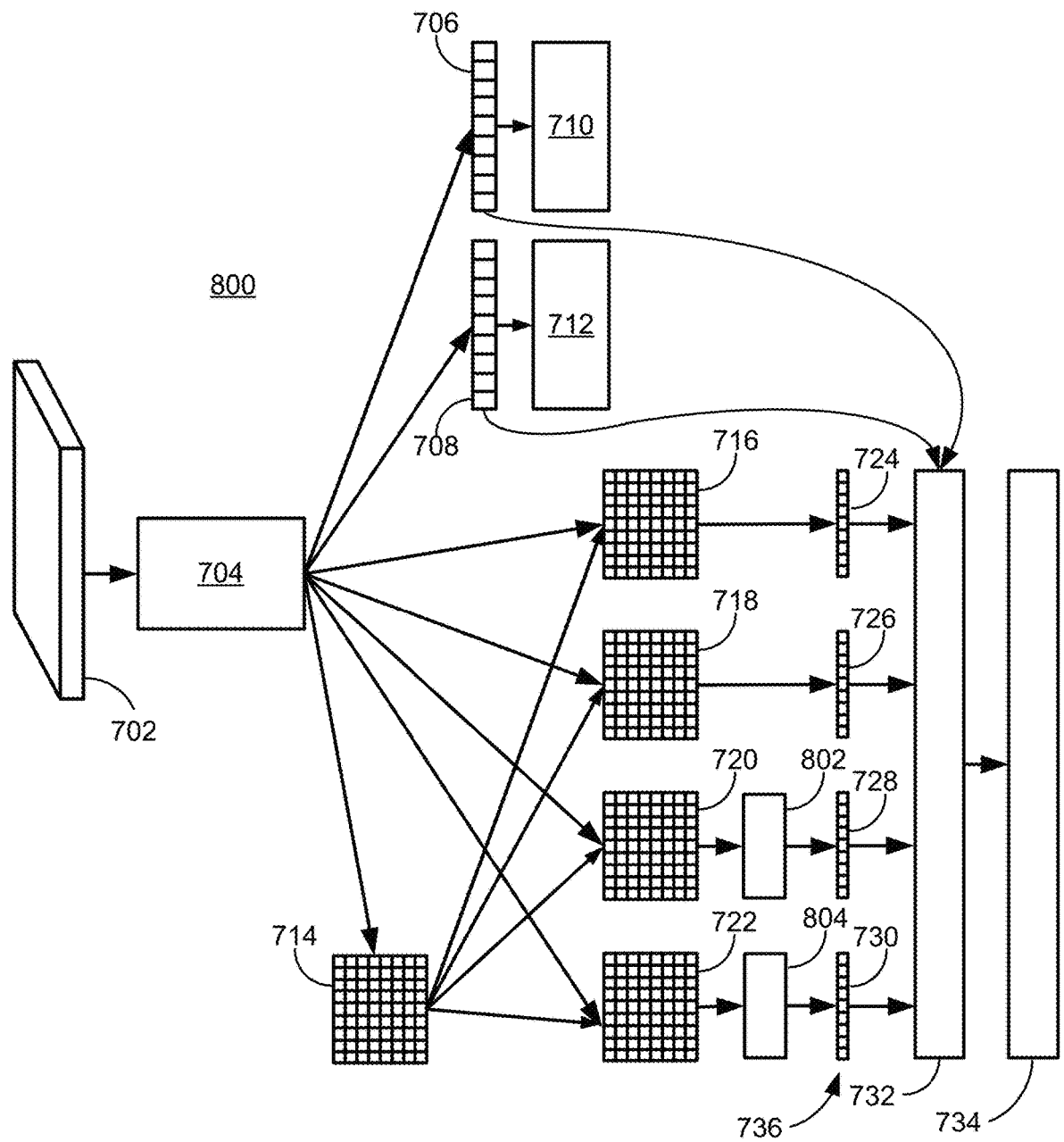
FIG. 8 is a diagram of example multi-task biometric system including segmented anti-spoofing processing and memory.

FIG. 8 is a diagram of a DNN 800 for performing biometric analysis. DNN 800 includes the same components as DNN 700 in FIG. 7 configured in the same fashion except for memories 802, 804 included between outputs from eye mask 720 and mouth mask 722 and inputs to eye mask neural network 728 and mouth mask neural network 730. Memories 802, 804 permit queuing of data from multiple frames of input data. A DNN 800 can receive as input a sequence of frames of video data that include images 702 of a user's face acquired over a short time period, for example one second or less and determine temporal segmentation mask outputs. The sequence of video frames can include motion of the user's eyes and/or mouth such as eye blinking or lip motions during speech.

Storing temporal image data regarding motion of a user's eyes and mouth can permit DNN 800 to determine liveliness with greater accuracy and higher confidence than determining liveliness based on a single static image. DNN 800 can process the temporal data by determining derivatives or calculating optical flow data on the facial mask images, for example. Eye mask neural network 728 and mouth mask neural network 730 can be configured to determine 3D convolutions by stacking the temporal image data in 3D stacks and using 3D convolution kernels to determine motion in the temporal image data. Memories 802, 804 can be applied to facial features that can be expected to move during the short time sequence input to DNN 800. For example, hair features and skin tones are typically not expected to change over a short time period and therefore would typically not benefit from temporal processing.

A DNN 800 including memories 802, 804 can be trained by video sequences of images 702 including facial feature motion and ground truth data describing the facial feature motion present in the video sequences. For example, video sequences of users blinking and/or speaking can be included in a training database. At training time, the images 702 of the video sequence can be input to DNN 800. Memories 802, 804 can store outputs from eye mask 720 and mouth mask 722 until the video segment ends or a limit on the number of frames of memory is reached. While the memories 802, 804 are being filled, the loss functions based on eye mask neural network 728 and mouth mask neural network 730 can be set to zero and the weights for eye mask neural network 728 and mouth mask neural network 730 can be frozen. When the video segment ends or the limit on frame storage is reached, the stored temporal data in the memories can be output to eye mask neural network 728 and mouth mask neural network 730 for processing and subsequent output of predictions to be used to determine loss functions. The loss functions can be combined into a joint loss function that can be backpropagated through the DNN 800 including eye mask neural network 728 and mouth mask neural network 730 to determine weights.

Figure 9:
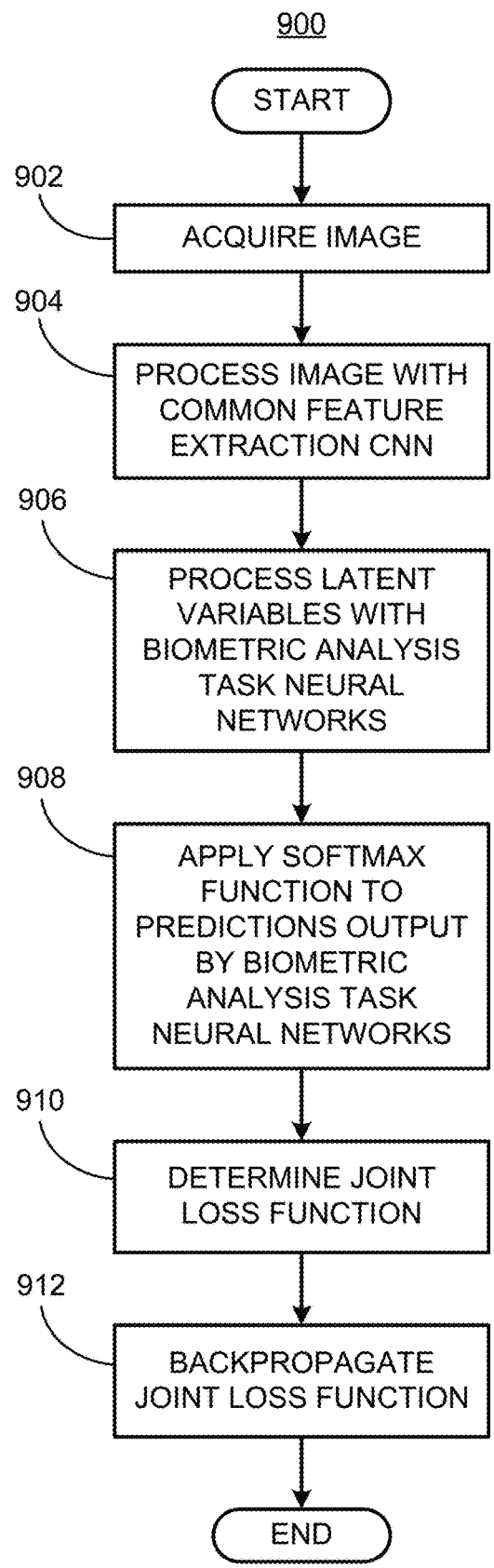
FIG. 9 is a flowchart diagram of an example process to train a deep neural network to perform biometric analysis tasks.

FIG. 9 is a flowchart, described in relation to FIGS. 1-4 of a process 900 for training a DNN 400 including a common feature extraction CNN 410, a plurality of biometric analysis task neural networks 412, 414, 416, 418, 420 and a segmentation neural network 422. Process 900 can be implemented by a processor of a computing device 115 or server computer 120, taking as input image data from sensors 116, 122, executing commands, and outputting biometric analysis task predictions. A DNN 400 is typically executed on a server computer 120 on a traffic infrastructure node 105 at training time and transmitted to a computing device 115 in a vehicle 110 for operation at inference time. Process 900 includes multiple blocks that can be executed in the illustrated order. Process 900 could alternatively or additionally include fewer blocks or can include the blocks executed in different orders.

Process 900 begins at block 902, where an image 402 is acquired from a training dataset. Image 402 includes ground truth data for one or more biometric analysis tasks as discussed above in relation to FIG. 3. In examples where ground truth data is not available for one or more biometric analysis tasks, the output from the one or more biometric analysis task neural networks 412, 414, 416, 418, 420 or the segmentation neural network 422 can be set to a null value and the weights for the one or more biometric analysis task neural networks 412, 414, 416, 418, 420 or the segmentation neural network 422 can be frozen. Freezing a neural network prevents the weights that are included in programming of the neural network from being updated based on backpropagating a joint loss function determined at block 910.

At block 904 the image 402 is input to a common feature extraction CNN 410 to determine facial features to be output as latent variables as discussed in relation to FIG. 5, above.

At block 906 the latent variables are input to a plurality of biometric analysis task neural networks 412, 414, 416, 418, 420 or the segmentation neural network 422 which process the latent variables to determine predictions regarding the input image 402 as discussed above in relation to FIG. 4. At inference time the predictions can be output to a computing device 115 to be used to operate a vehicle 110.

At block 908, at training time, the predictions output from biometric analysis task neural networks 412, 414, 416, 418, 420 are input to SoftMax functions 424, 426, 428, 430, 432 to condition the output predictions to be between 0 and 1. Conditioning the output predictions permits the output predictions to be combined at block 910 into a joint loss function without one or more of the output predictions numerically dominating the calculations.

At block 910 the output from the SoftMax functions 424, 426, 428, 430, 432 and the segmentation neural network 422 are combined with ground truth to determine a joint loss function for the DNN 400 in response to an input image 402.

At block 912 the joint loss function can be backpropagated through the layers of the DNN 400 to determine optimal weights for the layers of the DNN 400. Optimal weights are the weights that result in outputs that most closely match the ground truth included in the training dataset. As discussed above in relation to FIG. 5, training DNN 400 includes inputting an input image 402 a plurality of times while varying the weights that program the layers of the DNN 400. Training the DNN 400 includes selecting weights for the layers of DNN 400 that provide the lowest joint loss function for the greatest number of input images 402 in the training dataset. Following block 912 process 900 ends.

Figure 10:
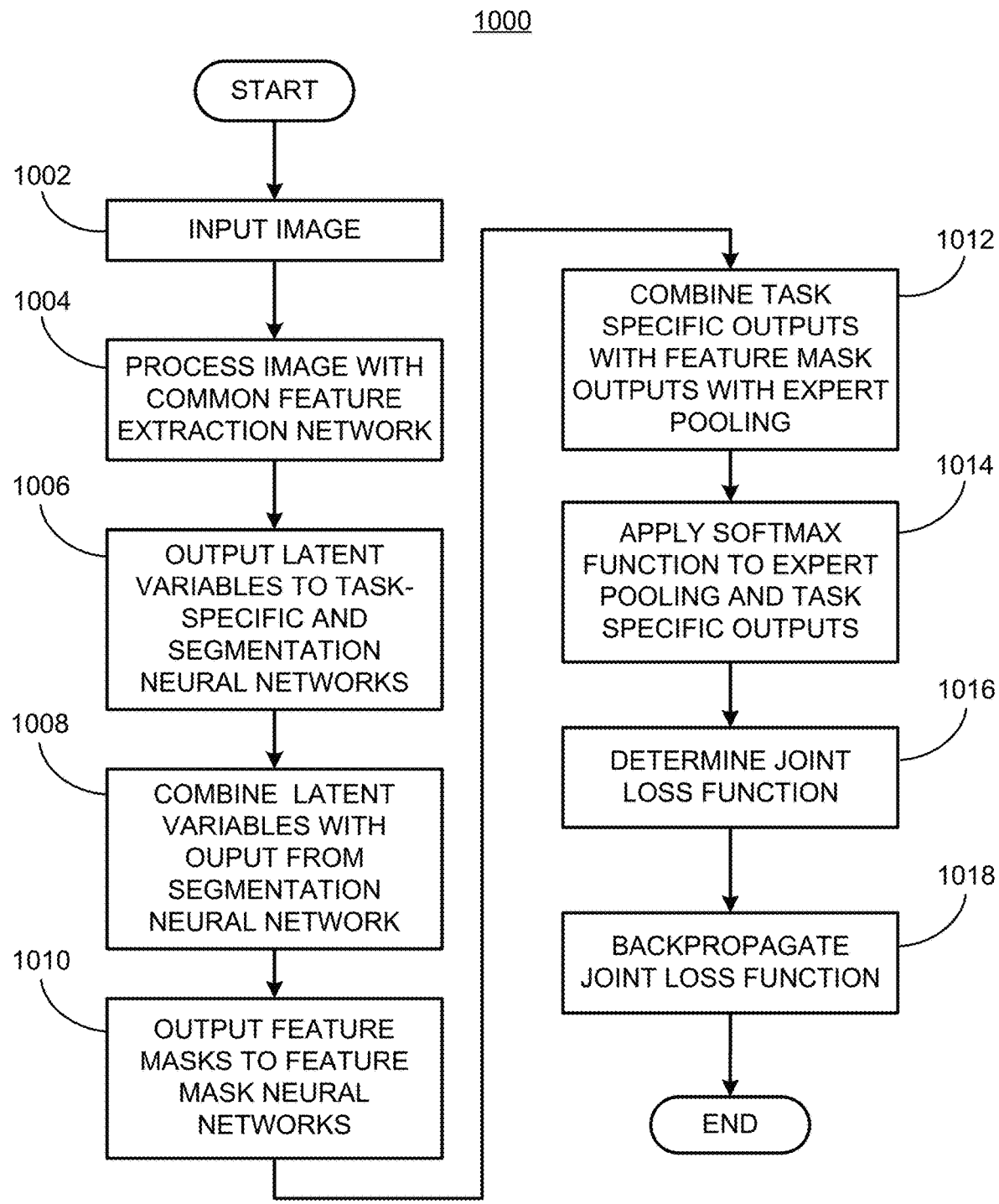
FIG. 10 is a flowchart diagram of an example process to train a deep neural network including segmented anti-spoofing processing to perform biometric tasks.

FIG. 10 is a flowchart, described in relation to FIGS. 1-9, of a process 1000 for training a DNN 700 including a common feature extraction CNN 704, biometric identification neural networks 706, skin tone neural network 708, a segmentation neural network 714 and feature mask neural networks 736. Process 1000 can be implemented by a processor of a computing device 115 or server computer 120, taking as input image data from sensors 116, 122, executing commands, and outputting biometric analysis task predictions. A DNN 700 is typically executed on a server computer 120 on a traffic infrastructure node 105 at training time and transmitted to a computing device 115 in a vehicle 110 for operation at inference time. Process 1000 could alternatively or additionally include fewer blocks or can include the blocks executed in different orders.

Process 1000 begins at block 1002, where an image 702 is acquired from a training dataset. Image 702 includes ground truth for one or more biometric analysis tasks as discussed above in relation to FIGS. 4, 7, and 8. In examples where ground truth is not available for one or more biometric analysis tasks, the output from the one or more biometric analysis tasks can be set to a null value and the weights for the one or more biometric analysis tasks can be frozen to prevent them from being updated based on a joint loss function determined based on the outputs from the biometric analysis tasks.

At block 1004 the image 702 is input to a common feature extraction CNN 704 to determine facial features to be output as latent variables as discussed in relation to FIGS. 4 and 5, above.

At block 1006 the latent variables are input to a plurality of biometric identification neural networks 706, skin tone neural network 708 and a segmentation neural network 714 which process the latent variables to determine first predictions regarding the biometric analysis tasks and facial feature segmentation tasks.

At block 1008 the output from the segmentation neural network 714 is combined with latent variables from common feature extraction CNN 704 at skin mask 716, hair mask 718, eye mask 720 and mouth mask 722 to form feature masks.

At block 1010 the feature masks are output to feature mask neural networks 736 to determine feature outputs in DNN 700. In DNN 800, outputs from eye mask 720 and mouth mask 722 are output to memories 802, 804, respectively, where a plurality of eye mask 720 outputs and mouth mask 722 outputs are stored. Temporal data from memories 802, 804 are output to eye mask neural network 728 and mouth mask neural network 730 at the end of the video sequence that includes images 702 input to the DNN 800.

At block 1012 the outputs from biometric identification neural network 706 and skin tone neural network 708 are combined with the outputs from feature mask neural networks 736 in expert pooling neural network 732. Liveliness prediction output from the expert pooling neural network 732 and identification predictions and skin tone predictions output from biometric identification neural network 706 and skin tone neural network 708 can be output at inference time to a computing device 115 to operate a vehicle. For example, the output predictions can be used to identify a user and permit access to a device. The output predictions can also be used to determine stress being experiences by a user or determine user alertness, for example.

At block 1014, at training time, predictions output from expert pooling neural network 732, biometric identification neural network 706 and skin tone neural network 708 are input to SoftMax functions 734, 710, 712, respectively. Softmax functions condition the output predictions to be between 0 and 1.

At block 1016 the outputs from the SoftMax functions 734, 710, 712 are input to loss functions which are combined to yield a joint loss function. Individual loss functions can be summed to form a joint loss function.

At block 1018 the joint loss function can be backpropagated through the layers of the DNN 700 to determine optimal weights for the layers of the DNN 700. Optimal weights are the weights that result in outputs that most closely match the ground truth included in the training dataset. Following block 1018 process 1000 ends.

Figure 11:
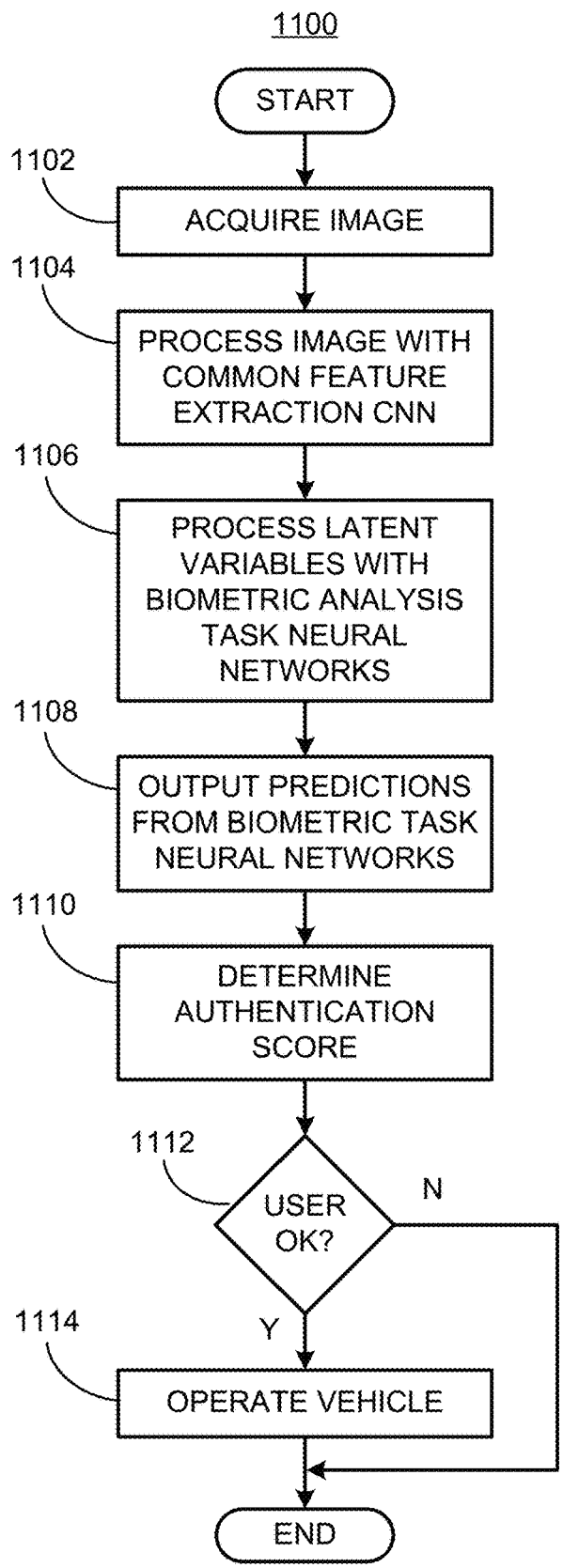
FIG. 11 is a flowchart diagram of an example process to operate a vehicle based on a multi-task biometric system.

FIG. 11 is a flowchart, described in relation to FIGS. 1-7, of a process 1100 for operating a vehicle based at least in part on biometric tasks. The process 1100 includes performing biometric identification and liveliness biometric analysis tasks and image segmentation with a DNN 700 including a common feature extraction CNN 704, a biometric identification neural network 706, a skin tone neural network and a segmentation neural network 714 for determining a biometric identification prediction and a liveliness prediction. Process 1100 can be implemented by a processor of a computing device 115 or server computer 120, taking as input image data from sensors 116, 122, executing commands, and outputting biometric analysis task predictions. Process 1100 could alternatively or additionally include fewer blocks or can include the blocks executed in different orders.

Following training a DNN 700 as discussed above in relation to FIG. 7, the trained DNN 700 can be transmitted to a computing device 115 in a device such as a vehicle 110 for inference. As discussed above in relation to FIG. 7, DNN 700 can be trained with biometric identification neural network 706 and skin tone neural network 708 and segmentation neural network 714. At inference time, the DNN 700 can be reduced to only include biometric analysis task neural networks that pertain to a specific task or tasks. In this example, the DNN 700 will be used for biometric identification and will include biometric identification neural network 706 and segmentation neural network 714. Reconfiguring the DNN 700 in this fashion permits training the DNN 700 with a large and varied training dataset that includes training images and ground truth for a plurality of biometric analysis tasks, while providing a lightweight DNN 700 that saves computer resources including memory space and execution time at inference time.

Process 1100 begins at block 1102 where the vehicle 110 acquires an image 702 using a sensor 116 included in the vehicle 110. Process 1100 could also be implemented in a security system, a robot guidance system, or a handheld device such as a cell phone that seeks to determine the identity of a potential user before granting access to a device.

At block 1104 the computing device 115 inputs the image 702 to the common feature extraction CNN 704 to determine facial features to output as latent variables.

At block 1106 the latent variables are input to biometric identification neural network 706, skin tone neural network 708 and segmentation neural network 714 to determine a biometric identification prediction and liveliness predictions.

At block 1108 the biometric identification prediction and the liveliness prediction are output from DNN 700 to the computing device 115 in the vehicle 110.

At block 1110 the computing device 115 can determine an authentication score by multiplying the biometric identification prediction and the liveliness prediction.

At block 1112 the computing device 115 tests the authentication score from block 1110. If the authentication score is greater than a user-specified threshold, the user is authenticated and process 1100 passes to block 1114. The threshold can be determined by processing a plurality of spoofed and real images 702 to determine distributions of authentication scores for spoofed and real input images 702. A threshold can be determined that separates the distributions of spoofed and real input image 702. If the authentication score is lower than the user-specified threshold the user fails authentication and process 1100 ends.

At block 1114 the user has passed authentication and the user is granted permission to operate the vehicle 110. This can include unlocking doors to permit entry to the vehicle 110 and granting the user permission to operate various vehicle components, such as climate control, infotainment, etc., to name a few examples. Following block 1114 process 1100 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to provide output from a selected biometric analysis task that is one of a plurality of biometric analysis tasks, based on an image provided from an image sensor;
wherein the selected biometric analysis task is performed in a deep neural network that includes a common feature extraction neural network, a plurality of biometric task-specific neural networks, a plurality of segmentation mask neural networks and an expert pooling neural network that perform the plurality of biometric analysis tasks by:
inputting the image to the common feature extraction neural network to determine latent variables;
inputting the latent variables to the plurality of biometric task-specific neural networks to determine a plurality of biometric analysis task outputs;
inputting the latent variables to a segmentation neural network to determine a facial feature segmentation output;
inputting the facial feature segmentation output to a plurality of feature mask neural networks wherein feature mask neural networks include a skin mask neural network and/or a hair mask neural network to determine a plurality of segmentation mask outputs;
inputting the plurality biometric analysis task outputs and the plurality of segmentation mask outputs to the expert pooling neural network to determine a liveliness task output wherein the deep neural network is trained by determining a joint loss function that includes a plurality of biometric task-specific neural networks and liveliness task loss functions and wherein the loss functions include weights based on larger or smaller training datasets and wherein the loss functions include weights that are frozen or set to zero; and
outputting the plurality of biometric analysis task outputs and the liveliness task output.

2. The system of claim 1, further comprising a device, wherein the instructions include instructions to operate the device based on the output from the deep neural network according to the selected biometric analysis task.

3. The system of claim 1, wherein a plurality of segmentation mask outputs from one or more segmentation mask neural networks are stored in one or more memories to determine temporal segmentation mask outputs based on a sequence of frames of video data.

4. The system of claim 1, wherein the plurality of biometric analysis tasks includes biometric identification, liveliness determination, drowsiness determination, gaze determination, pose determination, and facial feature segmentation.

5. The system of claim 1, wherein the common feature extraction neural network includes a plurality of convolutional layers.

6. The system of claim 1, wherein the plurality of biometric task-specific neural networks includes a plurality of fully connected layers.

7. The system of claim 1, wherein the plurality of segmentation mask neural networks includes a plurality of fully connected layers.

8. The system of claim 1, wherein the expert pooling neural network includes a plurality of fully connected layers.

9. The system of claim 1, the instructions including further instructions to train the deep neural network by:
determining a plurality of loss functions for the plurality of biometric analysis task outputs and the liveliness task output based on ground truth;
combining the plurality of loss functions to determine a joint loss function; and
backpropagating the loss functions and the joint loss function through the deep neural network to output a set of weights.

10. The system of claim 9, wherein the plurality of biometric analysis task outputs and the liveliness task output are input to a plurality of SoftMax functions before being input to the plurality of loss functions.

11. The system of claim 9, wherein one or more outputs from the plurality of biometric task-specific neural networks and the liveliness task output are set to zero during training.

12. A method, comprising:
providing output from a selected biometric analysis task that is one of a plurality of biometric analysis tasks, based on an image provided from an image sensor;
wherein the selected biometric analysis task is performed in a deep neural network that includes a common feature extraction neural network, a plurality of biometric task-specific neural networks, a plurality of segmentation mask neural networks and an expert pooling neural network that perform the plurality of biometric analysis tasks by:
inputting the image to the common feature extraction neural network to determine latent variables;
inputting the latent variables to the plurality of biometric task-specific neural networks to determine a plurality of biometric analysis task outputs;
inputting the latent variables to a segmentation neural network to determine a facial feature segmentation output;
inputting the facial feature segmentation output to a plurality of feature mask neural networks wherein feature mask neural networks include a skin mask neural network and/or a hair mask neural network to determine a plurality of segmentation mask outputs;
inputting the plurality of biometric analysis task outputs and the plurality of segmentation mask outputs to the expert pooling neural network to determine a liveliness task output wherein the deep neural network is trained by determining a joint loss function that includes a plurality of biometric task-specific neural networks and liveliness task loss functions and wherein the loss functions include weights based on larger or smaller training datasets and wherein the loss functions include weights that are frozen or set to zero; and
outputting the plurality of biometric analysis task outputs and the liveliness task output.

13. The method of claim 12, further comprising a device, wherein the instructions include instructions to operate a device based on the output from the deep neural network according to the selected biometric analysis task.

14. The method of claim 12, wherein a plurality of segmentation mask outputs from one or more segmentation mask neural networks are stored in one or more memories to determine temporal segmentation mask outputs based on a sequence of frames of video data.

15. The method of claim 12, wherein the plurality of biometric analysis tasks includes biometric identification, liveliness determination, drowsiness determination, gaze determination, pose determination, and facial feature segmentation.

16. The method of claim 12, wherein the common feature extraction neural network includes a plurality of convolutional layers.

17. The method of claim 12, wherein the plurality of biometric task-specific neural networks includes a plurality of fully connected layers.

18. The method of claim 12, wherein the plurality of segmentation mask neural networks includes a plurality of fully connected layers.

19. The method of claim 12, further comprising: training the deep neural network by:
   determining a plurality of loss functions for the plurality of biometric analysis task outputs and the liveliness task output based on ground truth;
   combining the plurality of loss functions to determine a joint loss function; and
   backpropagating the loss functions and the joint loss function through the deep neural network to output a set of weights.

20. The system of claim 1, wherein feature mask neural networks include two or more of the skin mask neural network, the hair mask neural network, an eye mask neural network, and a mouth mask neural network.

* * * * *